United States Patent [19]
LeToumelin et al.

[11] Patent Number: 4,645,881
[45] Date of Patent: Feb. 24, 1987

[54] DC LEVEL TRIP DETECTOR

[75] Inventors: Loic LeToumelin, Roquefort les Pins; Franck Tollon, Saint Laurent du Var; Yves Leduc, La Colle sur Loup, all of France

[73] Assignee: Texas Instruments Incorporated, Dallas, Tex.

[21] Appl. No.: 662,860

[22] Filed: Oct. 19, 1984

[30] Foreign Application Priority Data

Oct. 19, 1983 [FR] France ................................ 83 16647

[51] Int. Cl.$^4$ ........................ H04M 19/02; H04Q 3/00
[52] U.S. Cl. ..................................... 379/252; 379/352
[58] Field of Search ............. 179/18 HB, 81 R, 84 R, 179/84 VF; 307/350, 356

[56] References Cited

U.S. PATENT DOCUMENTS

| 3,312,787 | 4/1967 | Jorgensen | 179/84 R |
| 3,730,999 | 5/1973 | Shaffer | 179/84 R |
| 3,941,939 | 3/1976 | Holmes | 179/84 R |
| 4,447,675 | 5/1984 | Arntsen | 179/84 R |

FOREIGN PATENT DOCUMENTS

| 0034339 | 8/1981 | European Pat. Off. . |
| 0089687 | 9/1983 | European Pat. Off. . |
| 2816981 | 11/1978 | Fed. Rep. of Germany . |

*Primary Examiner*—James L. Dwyer
*Attorney, Agent, or Firm*—Gary C. Honeycutt; N. Rhys Merrett; Melvin Sharp

[57] ABSTRACT

The method includes generating a binary signal (S4A to S4D) which is time modulated. To do this, an alternating signal (S1) is compared with a known cyclical signal (S5) and a threshold signal. There is measured the durations between the transitions of the modulated signal by means of a high speed clock and by means of counting in the positive and negative directions of the clock pulses for one or more periods of the signal under examination. If, after counting, a residual value is found, one generates a binary signal representing the transition.

19 Claims, 16 Drawing Figures

DC LEVEL TRIP DETECTOR

This invention relates to the processing of periodic signals, particularly sinusoidal signals, and, more specifically, relates to the detection of the direct current component of such a signal.

In telephone systems, it is known that the bell signal consists of a loop signal having a direct component on which is superimposed an alternating signal which, at the central station, is a sinusoidal signal. It is also known that the moment of the lifting of the receiver by the subscriber must be determined with precision for the purpose of stopping the bell current, establishing the completed communication circuit, starting tariff calculation, etc. The method for determining this moment consists of detecting the transition of the direct component circulating on the subscriber loop, this component undergoing an abrupt increase following the modification of the impedance of the loop at the time of receiver lifting. This detection is effected in an apparatus located in the central station which is called SLIC, Subscriber Loop Interface Curcuit.

The subscriber circuit therefore effects the connection between the central station and the subscriber and effects the monitoring of the condition of the subscriber loop, specifically, the detection of receiver lifting and replacement, particularly during the ringing phase. The detection circuit for the loop state must detect the above mentioned increase in the direct component by a comparison with a predetermined threshold. The threshold must be precise, that is, a transition of 0.1% in the direct component with respect to the alternating component must be detectable. In addition, the detection must be effected rapidly as the subscriber should not hear the bell in the receiver. This rapidity must be all the more pronounced as the detection should preferably be effected several times to distinguish the detection as much as possible from line noise and avoid false detections.

In addition, the operating conditions under which a detection circuit of this type must function can be varied as a function of local circumstances, of frequency and form of the bell signal, of atmospheric conditions, of longitudinal parasitic currents, the intensity of which can be very high in industrial areas (factories, subway), etc. The demands placed on such circuits are therefore very severe.

At present, the detection of lift off moment is effected generally by a low pass filter having a cut off frequency of less than 15 Hz. However, such a low pass filter must have a very large capacitance and must be made in an integrated circuit.

The invention has, therefore, as an object a method and apparatus for detecting the transition of the direct component of a periodically varying signal, wherein the precision and rapidity are compatible with the norms set for telephone interface by the French Telephone Administration (P.T.T.), and which can be made in integrated circuit form.

There is provided a method for detecting a transition in the direct component of a periodic signal characterized in that it includes establishing a threshold value above which a transition is to be considered as significant, in generating at least one known cyclical signal, the frequency of which is large with respect to the frequency of said alternating signal, in time modulating a binary signal with the difference between the alternating signal, the threshold signal, and the cyclical signal, in generating a high speed clock signal, in accumulating the pulses of the clock signal in the positive direction for a first logic level of the modulated signal, and in a negative direction for a second level of this signal, in sampling the result of this accumulation over at least one period of said alternating signal, and in generating an output signal having a given logical value if the accumulation produces a residual value at the end of the last sampling period.

The invention also has as an object an apparatus for carrying out the method as set forth above as well as a telephone interface circuit using this device.

The invention will be described in the description which follows and with reference to the following drawings, both given only as an example.

In the description which follows, it is assumed that the invention is used in connection with a telephone interface, which happens to be a particularly advantageous application for the invention. However, this is not, of course, the only application, and the invention can be used whenever it is useful to detect a transition (increasing or decreasing) of a constant component of a complex signal with this component mixed with an alternating component, which alternating component could have a sinusoidal, square, rectangular, or other form.

Figure 1:
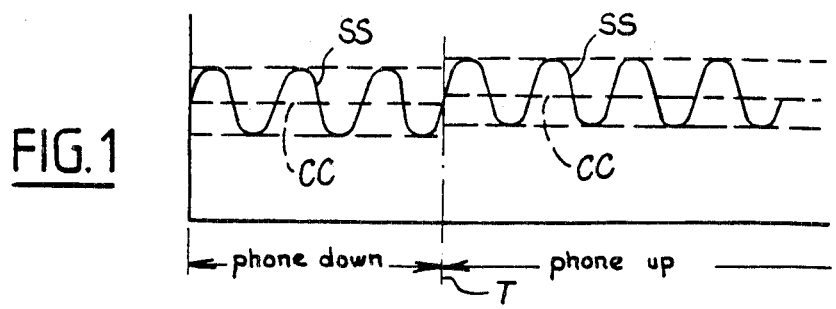
FIG. 1 is a digram showing a transition in a constant component which is to be detected, in a telephone bell signal at the time when the called subscriber answers.

This being said, FIG. 1 will now be examined wherein there is shown, in a telephone interface, the receiver down-up transition of a bell signal at the time of a call. The bell signal includes a direct component CC on which is superimposed an alternating signal SS which, in the example, and upon leaving the central station, is sinusoidal, but which arrives at the interface circuit in a more or less distorted form as a function of various conditions, such as the quality of the line of the subscriber, the length of this line, the longitudinal parasitic currents, atmospheric perturbations, etc. At the time of lifting the receiver, there is a transition T of the steady state current passing through the loop due to the fact that a lesser impedence than previously is on the line. The transition T must be determined with precision and in a minimum of time, for example, in not more than three periods of the alternating signal, this latter signal being then surpressed from the line by the central station to permit communication between the subscribers. It is to be noted that the amplitude of the transition T has been greatly exaggerated in the drawing; an amplitude variation of only 0.1% of the direct current with respect to the alternating current must be detectable.

It is to be noted that the signal SS can be the bell signal or any other periodic signal which is derived from a bell signal or which serves to generate it.

Figure 2:
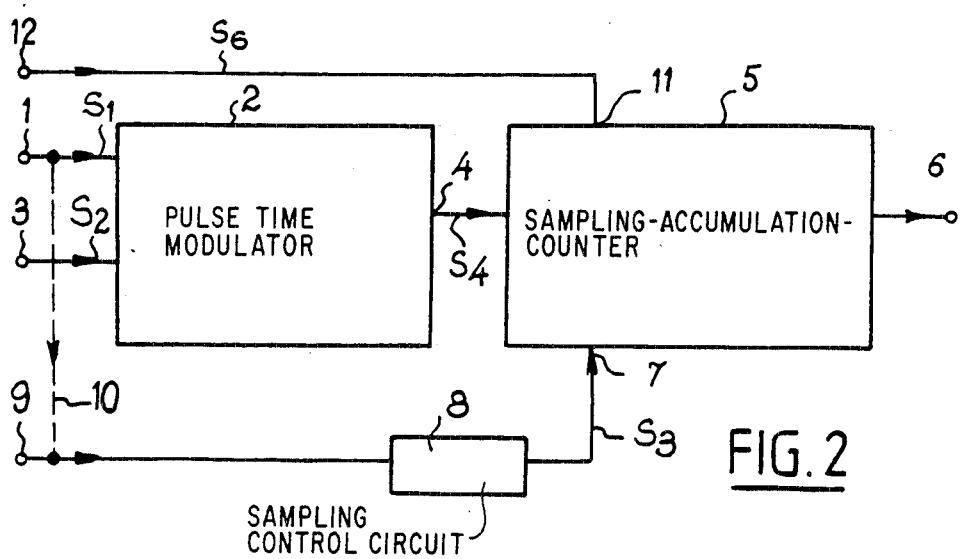
FIG. 2 shows a simplified schematic of the circuit according to the invention.

FIG. 2 shows a very simplified diagram of the detection circuit according to the invention. Signal S1, the transition of which is to be detected, is applied to terminal 1 of pulse time modulator 2, which has a second input terminal 3 to which is applied threshold signal S2 which fixes the level above which the transition of the direct component of the signal S1 is to be considered as indicating a receiver lifting. Modulator 2 includes a output terminal 4 which is connected to a sampling-accumulation-counter circuit 5, at the output terminal 6 of which appears the useful signal in digital form (a "1" level for receiver down and a "0" level for receiver up or the inverse). Circuit 5 requires a signal of frequency S3 which is applied thereto over terminal 7 by means of sampling control circuit 8 which is itself connected to input terminal 9, this signal being made up of pulses with one pulse per period of the signal S1 to be examined. In a telephone interface, the terminal 9 can receive the bell signal from the oscillator provided for this in the central station, but in a more general application of the invention, the terminal 9 could be connected to terminal 1, divider 8 receiving then the signal to be examined (connection 10 being dotted into FIG. 2). The input signal can be an analog voltage having a symetrical or differential form.

Modulator 2 is adapted to modulate a binary, or two state, signal, either by pulse position modulation, PPM, or by pulse width modulation, PWM, in proportion to the difference between the signals S1 and S2. The output signal S4 (FIG. 2 and 3) of the modulator represents therefore, in the form of time modulation, the difference between these two signals.

Figure 3:
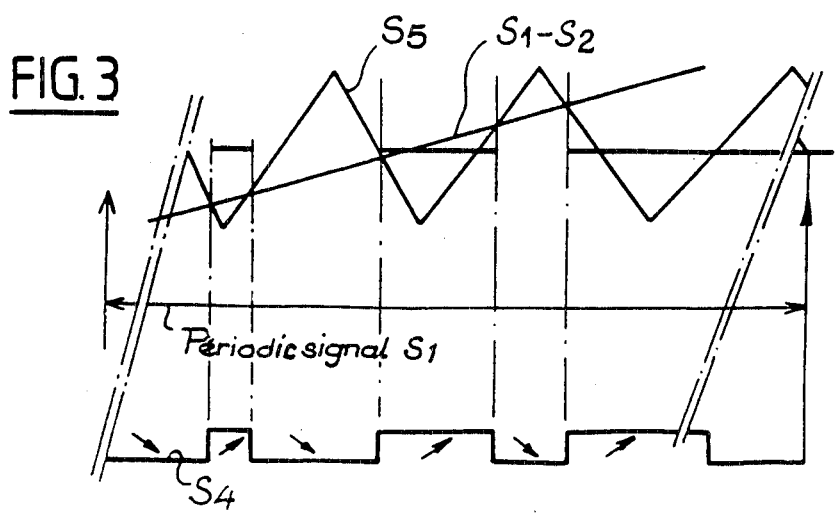
FIG. 3 is a diagram showing the modulation principle used according to the invention.

In FIG. 3, it is seen that the modulation is effected by a comparison in the period of signal S1, of said difference to the voltage S5 of a periodic triangular form which is generated in the modulator. If, thereafter, there is calculated the average value of the modulated binary signal, one would obtain the transition information, since when there is no transition, the average integrated value of the signal S4 is equal to zero, while a transition will entail a difference signal. This integration, (which will be described in detail hereinafter) includes counting updown pulses of a relatively high frequency, during the "1" and "0" durations of the modulated signal. It is for this purpose that the sampling-accumulation-counter circuit 5 has a supplementary input 11 (FIG. 2) connected to input terminal 12 to which is applied a high speed clock signal S6. For example, if the bell signal has a frequency of 16 Hz, the signal S5 can have a frequency of 2.5 kHz and the signal S6 a frequency of 500 kHz.

In the case where modulator 2 effects pulse width modulation, PWM, the time modulation representing the difference discussed above is contained in the width of the successive pulses, with the ampitude and the period of the pulses being substantionally constant. In the case of pulse position modulation, PPM, the difference information is coded into the relative positions in time of pulses of relatively short duration. These pulses have a constant amplitude and width, and only their time position will be modified. It is to be noted that the modulators for effecting these two types of modulation are essentially identical, and one of them could be easily derived from the other.

As indicated above, signal S4 obtained by modulation contains successive time intervals which are measured in circuit 5 by means of high speed clock S6. The result of the measurement will be a whole number of periods of the high speed clock. For each period of the modulated signal, the measurement of the interval of time when the modulated signal is larger than the triangular signal, is assigned a particular sign and the time interval measurement when the modulated signal is less than the triangular signal is assigned the opposite signal. A counter in circuit 5 counts the relative values thus obtained during a fundamental period of input signal S1.

This digital accumulation is sampled and reset periodically at the fundamental frequency of this signal from which results a digital value at this fundamental frequency.

It has been seen that the time information which constitutes the output of modulator 2 will be proportional to the input voltage of this modulator so that, over the same measurement interval, their integrals will also be proportional. If the fundamental frequency of the triangular signal signal S5 of the pulse time modulator is large with respect to the fundamental frequency and the harmonics of the input signal S1, and if the frequency of the high speed clock S6 is large with respect to the frequency of the output signal S4 of the pulse time modulator 2, the numerical result of the accumulation will constitute the integral of the time interval measurements. The numerical result of the accumulation is thus proportional to the integral of the input signal of the modulator, that is, the integral of the difference between the input signal S1 and the threshold signal S2. As the integral of the fundamental and the harmonics of the input signal over an interval of time equal to its period is zero, the numerical result of the accumulation will be proportional to the difference between the direct component of the input signal and the threshold signal.

During each accumulation, the value of the integral which is being calculated is stored digitally in circuit 5. The sign of the digital result at the end of each accumulation will indicate if the direct component of the input signal is more or less than the threshold S2, this sign once sampled constituting the output information of the device according to the invention.

In the arrangement of FIG. 2, which has been described, in order that the digital value obtained at the end of the accumulation of the clock pulses (count updown) be exactly proportional to the integral of the difference between the direct component of the signals S1 and S2, it is necessary that the frequency of the triangular signal S5 be large with respect to fundamental and harmonic frequencies of the signal S1 and that the frequency of the clock signal be large with respect to that of signal S5. However, these requirements run counter to technological and physical limitations and, in reality, there will be an error which is called hereinafter, "zero displacement error" which occurs in the values of the frequencies indicated above.

Figure 4:
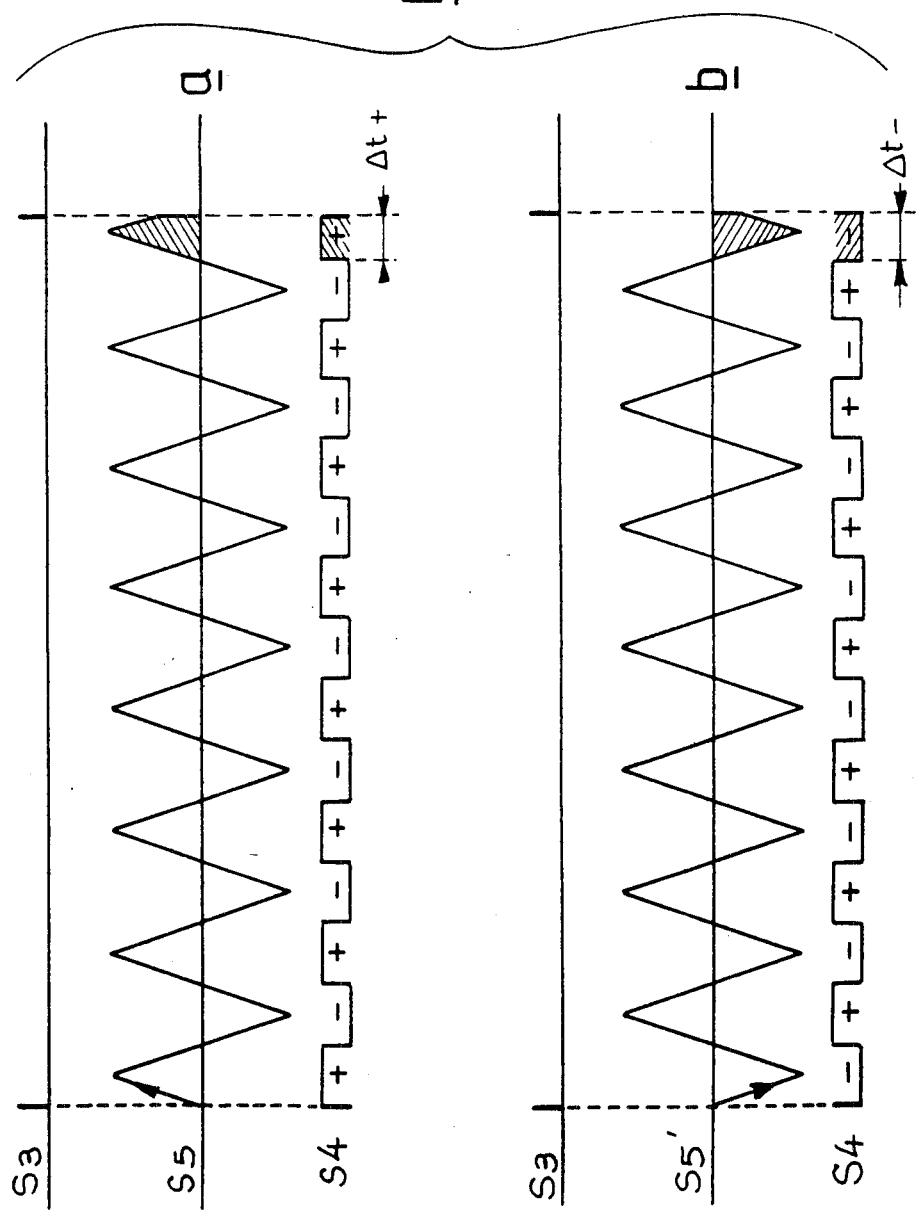
FIG. 4 is a diagram illustrating the appearance of a zero error in the modulation of the binary signal.

To illusrtate this error, there is represented in FIG. 4a, the curves representing the case where the input signal S1 does not include an alternating component. In these conditions, in regard to the fundamental sampling period of the digital value, (which in this hypothetical can not, of course, be taken from the signal S1 as this is a direct signal), it is possible that, at the end of this period, the triangular signal which is not synchronous with the sampling signal S3, will not as yet have passed through zero, even though there is no alternating component, and the average value will not be equal to zero and there will remain a residual numerical value (here counted positively) corresponding to delta t which has no negative counterpart. FIG. 4b shows that an error of the opposite sign will be produced when the triangular signal is in phase opposition.

Another error which can occur in the detection result can come about from the limited nummber of samples of the input signal S1 which are taken in evaluating its intergal over the fundamental frequency. Due to this, the result of the numerical accumulation can be different from the theoretical mathmatical result which would entirely cancel the fundamental and the harmonics of the input signal calculated over the period of the fundamental. The error thus introduced depends in particular on the first and last samples taken from the input signal. An error will result which is a decreasing function of the ratio between the frequency of the triangular signal and that of the input signal and the ratio between the amplitude of the triangular signal and that of the input signal. This error is also a function of the phase difference between the sampling pulses S3 and the input signal S1.

Similarly, because of the limitations of technology and physical limitations, the frequency of the high speed clock S6 is not infinitely large with respect to the frequency of the triangular signal S5. Because of this, the measurements of the modulated time intervals which are whole numbers of periods of the clock signal will have a truncation error. This error is a decreasing function of the error between the frequency of the clock signal and that of the triangular signal.

Figure 5:
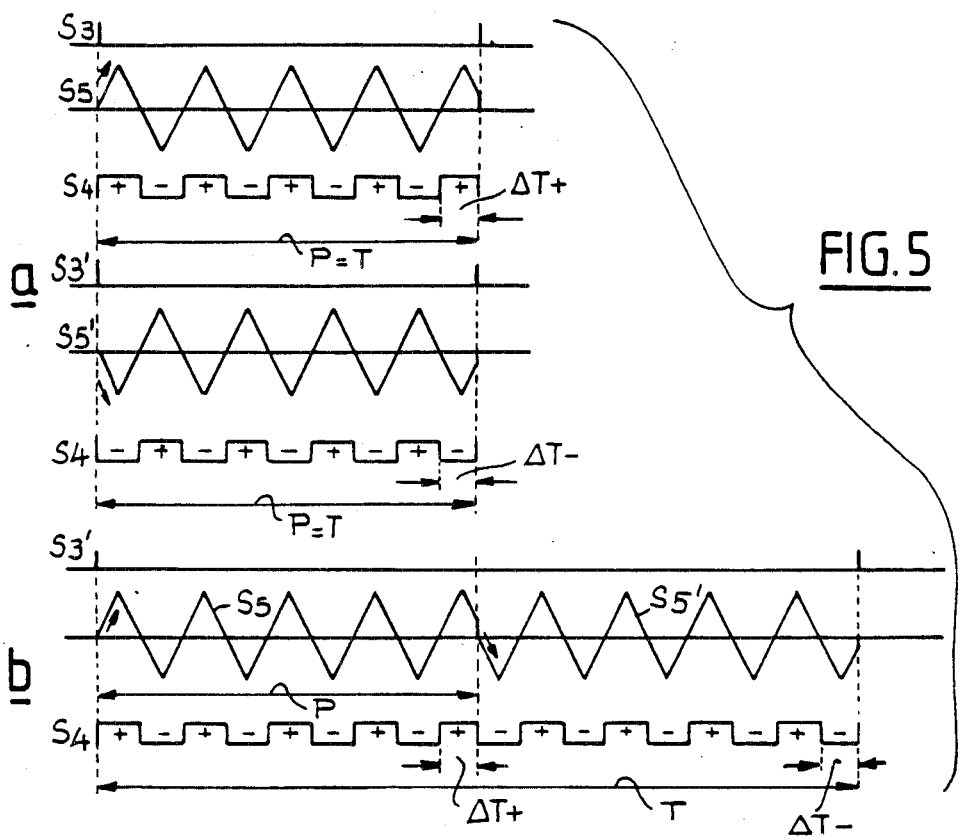
FIG. 5 is a diagram illustrating the manner in which the zero displacement error can be avoided.

The invention contemplates compensating for the displacement error by a particular use of the triangular signal and the up/down counter. The principle of this compensation is shown in FIG. 5 in which it is assumed, for the sake of the explanation as with FIG. 4, that the signal does not have an alternating component. It is seen in FIG. 5 that the cancellation of the error can be effected by compensating that error obtained (delta t) during the integration time delta t equal to the period P between two sampling pulses (signal S3), when the triangular signal starts, after each resetting to zero of the accumulation with a positive slope, by a zero error (delta t) obtained over a same integration time when the triangular signal is symetric to the processing (signal S5, that is, the same amplitude but opposite sign) and begin after each reset with a negative slope. The two integrated values therefore have the same equal error but of opposite sign so that it suffices to accumulate the counting pulses as a function of these two integration values.

The two integration values can therefore be obtained either simultaneously (FIG. 5a) or successively (FIG. 5b).

In other words, the FIG. 5a corresponds to the simultaneous use of two triangular signals with an accumulation of the counting pulses over a single period P while FIG. 5b uses sucessively two triangular signals over a double duration of the period P. In the two cases, the number of samples of the signal to be examined utilized for the calculation of the integral is the double of the number of samples used for the calculation in the arrangement which functions according to the diagram of FIG. 3, that is, with a single triangular signal. The integration error is therefore reduced, and, in fact, in FIG. 5, as to the integration error and with respect to FIG. 3, events occur as if the frequency of the triangular signal had been doubled or the fundamental and harmonic frequency of the signal under examination had been divided by two.

Of course, the utilization of this zero displacement compensation is only possible if the frequency and amplitude of the triangular signal, the frequency of the input signal, and the phase relation between the triangular signal and the reset pulses are fixed. This is the case in all of the applications intended for the invention.

Figure 6:
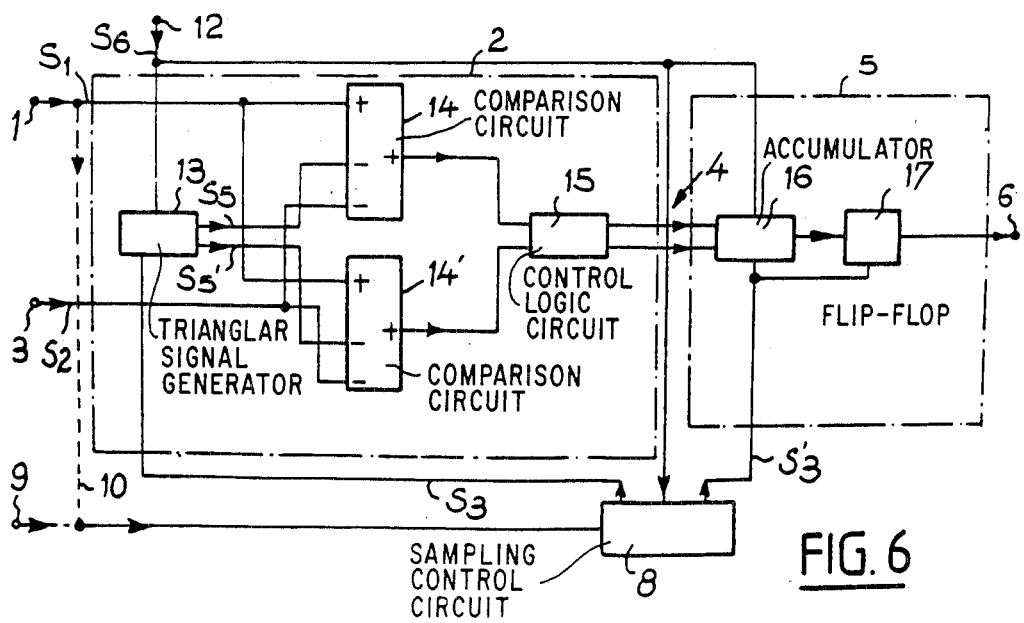
FIG. 6 is a simplified diagram of a first embodiment according to the invention for compensating for the error of zero displacement.
Figure 7:
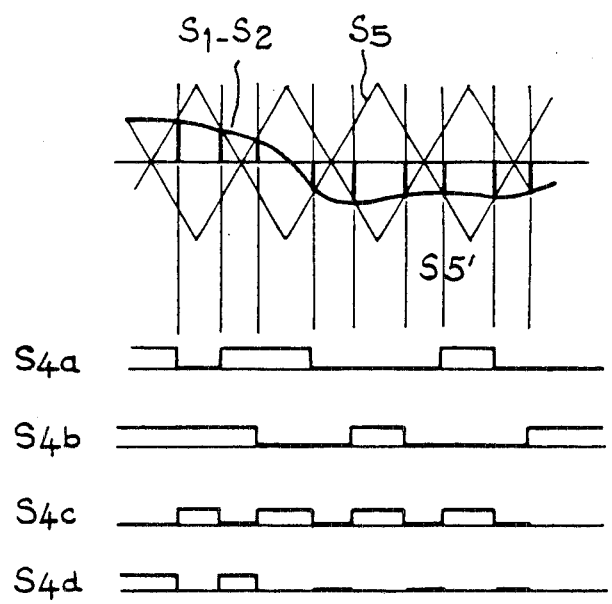
FIG. 7 is a diagram illustrating the operation of the FIG. 6 circuit.

FIG. 6 shows an arrangement using the zero displacement error compensation with the simutaneous use of two triangular signals. In this Figure, identical references are used for the elements described in FIG. 2.

Modulator 2 includes a generator 13 which produces two symetric triangular signals S5 and S5' and is connected to two comparison circuits 14 and 14'. These are connected to control logic circuit 15 which provides counting control signals to accumulator circuit 16 which is an up-down counter. The output of this circuit is connected to memorization flip-flop 17.

The triangular signals provided by generator 13 are restarted at each pulse corresponding to the start of a period of signal S3, therefore with recurrence which corresponds to the frequency of signal S1.

The triangular signal and the difference between the input signal S1 and the threshold signal S2 and therefore compared in the comparison circuit 14 or 14' depending on the source of two signals S4a and S4b processed in logic circuit 15. In other words, if the difference between the signals S1 and S2 is greater than the triangular signal S5, the signal S4a is at level 1 and this signal is at level O in the contrary case. Similarly, the signal S4b from comparison circuit 14' is at level 1 when the difference between the signals S1 and S2 is greater than signal S5' and is at level O in the opposite case.

The logic circuit 15 combines the two signals thus processed to provide a signal S4c which is at level 1 in the case of opposite levels of the signals S4a and S4b and which in these conditions is capable of inhibiting all counting of up-down counter 16. The logic level of the other signal S4d provided by the logic circuit 15 is equal to that simultaneously had by the signals S4a and S4b for determining the counting direction (level 1, up, level 2, down). From this, the accumulation of the pulses of the high speed clock (signal S6) in counter 16 over a period of the signal S1 takes into account the sum of the the equal and opposite zero displacement errors of the two triangular signals S5 and S5', providing a resulting numerical value having no displacement error. In addition, the integration error is less than in the arrangement of FIG. 3. The sampling of counter 16 by signal S3 from sampling control circuit 8 provides for storing in flip-flop 17 output binary information which is generated at the frequency of the input signal S1.

Figure 8:
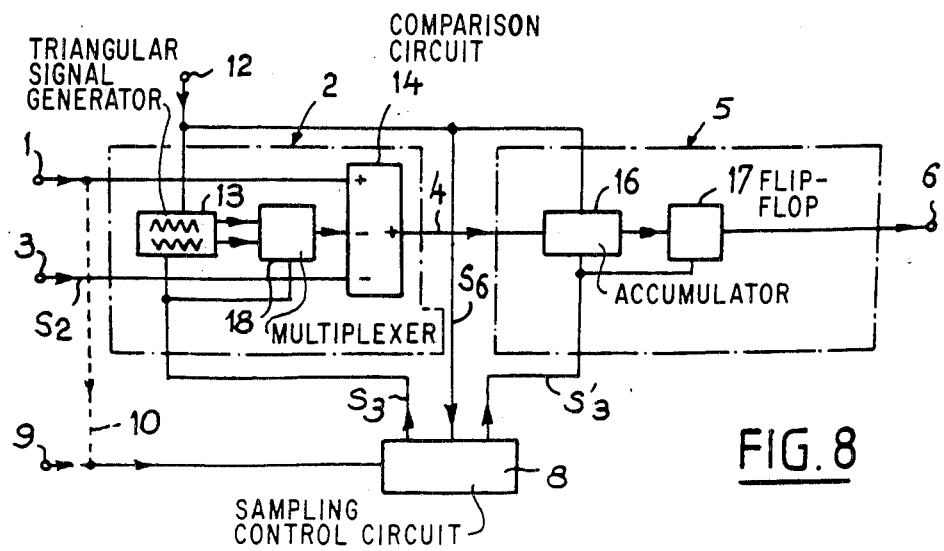
FIG. 8 is a simplified diagram of a second embodiment of the circuit according to the invention.

FIG. 8 shows an arrangement for carrying out FIG. 5b, that is, the elimination of the zero displacement error by applying to a single subtraction and comparison circuit 14, alternatively, the signals S5 and S5', the forms of which being symmetric as in the arrangement of FIG. 6. For this reason, comparison circuit 14 is here connected to triangular signal generator 13 by means of multiplexer 18.

Sampling control circuit 8 here effects the resetting to zero of the triangular signals and controls the multiplexer 18 for assuring the correct and alternative distribution of the triangular signals each period of the input signal. At the same time, the frequency of the input signal is divided by two and applied to counter 16 and flip-flop 17 for sampling.

Comparison circuit 14 therefore receives successively:

(1) During a first period of signal S1, a triangular signal S5 with an original positive slope, then, (2) During the following period of the signal S1, a triangular signal S5 with an original negative slope.

As the sampling and the resetting of the counter are effected at a frequency which is half of the frequency of the signal S1, the two zero displacement errors of opposite sign are taken into account each accumulation and, after each sampling, the flipflop 17 thus contains binary output information having no displacement error. In this case also, the integration error is twice as small as in the case of FIG. 3.

Figure 9:
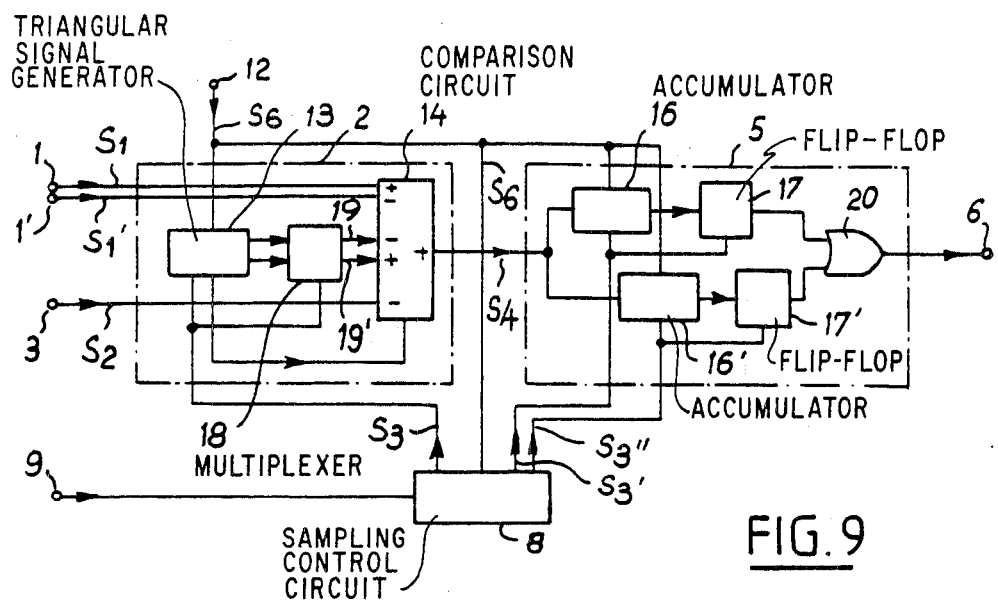
FIG. 9 is a simplified diagram of a third embodiment according to the invention.
Figure 10:
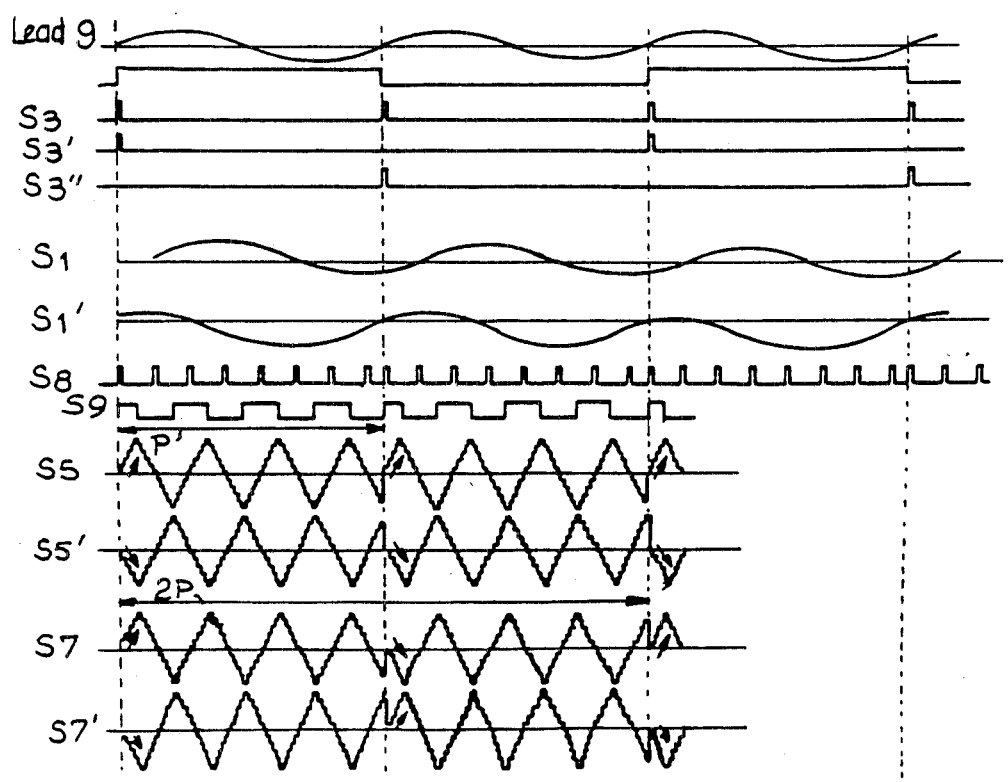
FIG. 10 shows the signals appearing in the FIG. 9 circuit.

FIG. 9 shows an embodiment in which, first of all, the input signal is a voltage in differential mode applied to the two input terminals 1 and 1' (signals S1 and S1', FIG. 10). In addition, the zero displacement error is eliminated by doubling the counter 5.

Triangular signal generator 13 is constructed to generate a triangular voltage in the form of steps, the portions of which are generated under control of signal S6 constituting the high speed clock (FIG. 10). Under control of signal S3 derived from the bell signal applied to terminal 9 (or of a signal derived from a signal under examination in applications other than telephones), which has the same period P as the signal S1, the triangular voltages are reset to zero each period of signal S1, while multiplexer 18 applies these alternatively to two distinct input terminals 19 and 19' of subtraction and comparison circuit 14 (signals S7 and S7', FIG. 10'). It is to be noted that in diagram 10, the time scales do not correspond to those of the frequencies used.

Circuit 5 includes two bi-directional counters 16 and 16' associated with two memorization flipflops 17 and 17', the outputs of which are logically combined in and-or gate 20 which applies to terminal 6 the useful signal, that is, the transition of the direct component of the voltage in differential mode applied to terminals 1 and 1'. Counters 16 and 16' as well as flip-flops 17 and 17' are controlled by signals S3' and S3" derived from the signal S3 in control circuit 8, these signals each having a frequency which is half that of the input signal with the signals being displaced by a period P, so that the accumulations on modulated signal S4 are effected in these counters in parallel but with a time displacement equal to this period P. Thus, the output signal of terminal 6 is a logical function of these two binary signals from the sampling by the two signals S3' and S3" of the two counters 16 and 16'. This logical function depends upon the choice of the signs assigned to the measurements of the modulated time intervals and the transition to be detected: increasing the threshold of the lower values to the higher values or decreasing of the threshold of the higher values to the lower values. Even though each accumulation lasts two periods, the interlacing of the two accumulations allows the provision of a sample each period of the input signal and thus the regeneration the output signal each period of the input signal. The maximum time for detecting a transition in the continuous level of the input signal is three periods of the input signal.

The logical function effected by gate 20 is here an "and-or", as, in the example, the measurements of the samples of modulated time (signal S4) are assigned a positive sign when the modulating signal is greater than the triangular signal and negative in the opposite case. In addition, the transition to be detected corresponds to a changing of the sign of the accumulated value from positive to negative.

Figure 11:
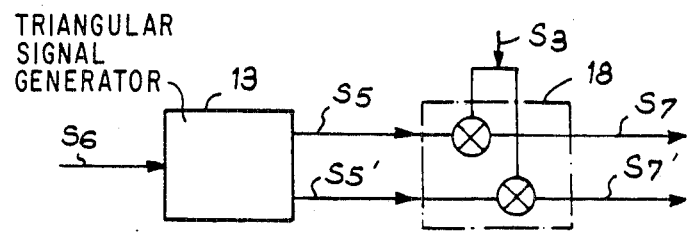
FIG. 11 shows a diagram equivalent to a part of the modulator making up a part of the FIG. 9 circuit.
Figure 12:
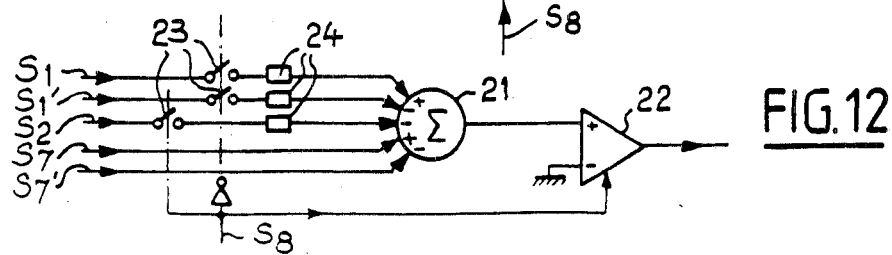
FIG. 12 is a diagram of a multiplexer used in the modulator of the circuit according to the invention.

FIGS. 11 and 12 show functionally the triangular signal generator 13 and multiplexing under control of signal S3, to obtain signals S7 and S7', on the one hand, and the control of the subtraction and comparison circuit 14, on the other hand. It is seen that this latter circuit includes an adder 21 and an amplifier-comparator 22. Adder 21 carries out the following:

$$S7 - S7' + S1' - S2$$

It is this subtraction operation between S1 and S1' of the input signal which eliminates any component of the common mode which might be present on terminals 1 and 1' and thus rejects the longitudinal perturbations superimposed on the transverse bell signal.

The signals are applied to adder 21 by means of switches 23 controlled by signal S8 which is derived from high speed clock signal S6 and from several maintenance circuits 24.

Figure 13:
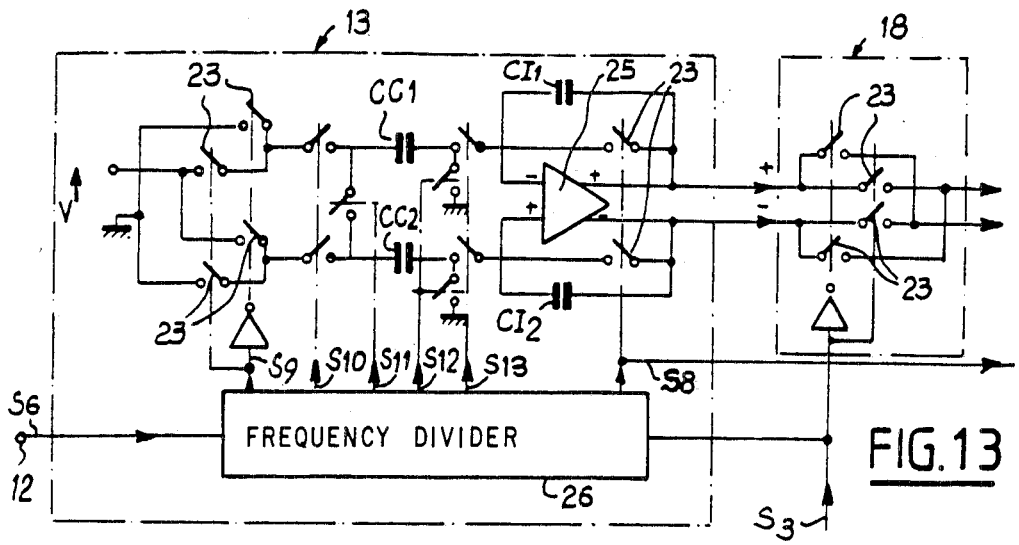
FIG. 13 and 14 are detailed schematics of a modulators according to FIG. 11 and 12.
Figure 14:
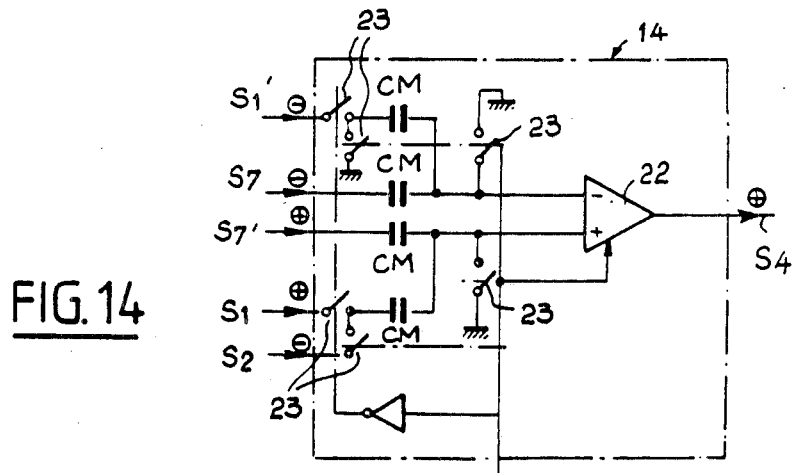

FIG. 13 and 14 show detailed diagrams corresponding to the simplified diagram of FIG. 9 and which could be constructed as an integrated circuit.

FIG. 13 shows generator 13 and multiplexer 18 and FIG. 14 shows the subtraction and comparison circuit.

The triangular voltage generator 13 includes a Miller integrator with commutated capacitors CC1 and CC2 with differential structure. Such an integrator is well adapted to intense integation applications.

Capacitors CC1 and CC2 cooperate with differential amplifier 25 having differential inputs and outputs to which are connected two integration capacitors CI1 and CI2.

Capacitors CC1 and CC2 play the role of integration resistors. Switches 23 effect appropriate commutations and resets (transistors CMOS) under control of clock signals S8–S13 generated by frequency divider circuit 26 from high speed clock 56 and signal S3 representing the period P of the input signal.

The generator receives a supply voltage V, the value of which in combination with the ratio between capacitors CC1+CC2 and CI1+CI2 determines the amplitude of the elementary increments of the triangular voltages S5 and S5'. The polarity of signal S9 determines the sign of the slope of these voltages, the amplitude of which is determined by the amplitude of the increment and the number of increments per half period of signal S9. This latter also determines the frequency of the triangular voltage. The multiplexer 18 includes four switches 23 controlled by signal S3.

FIG. 14 shows comparison and subtraction circuit 14 which includes four maintenance capacitors of equal values which are commutated by switches 23 under control of signal S8. During the short reset pulses S8 of generator 13, the inputs of the comparator amplifier 22 are also reset to zero. The output of this amplifier remains at its previous state.

Figure 15:
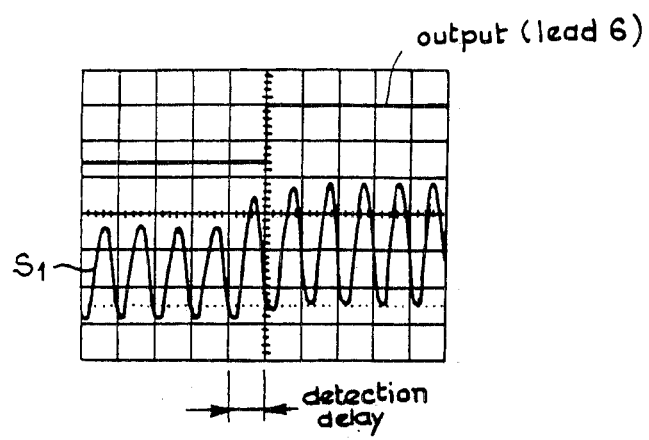
FIGS. 15 and 16 are two oscillograms illustrating the results obtained by the circuit according to the invention.
Figure 16:
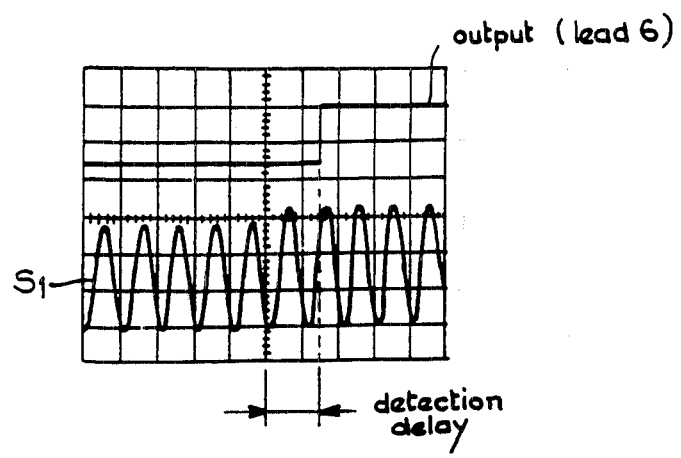

FIGS. 15 and 16 show two examples of the detection of a transition with the above described circuit. The first example shows the detection at a period of the alternating signal, the transition of the direct component being relatively substantial. In the case of FIG. 16, the transition in less marked and the detection occurs after about two cycles of the input signal.

What is claimed is:

1. Method for detecting a transition of the direct current component of an alternating signal, characterized in that it includes establishing a threshold value (S2) above which the transition is considered to be significant, in generating at least one known cyclical signal (S5, S5′) the frequency of which being large with respect to the frequency of said alternating signal (S1), in time modulating a binary signal (S4) with the difference between the alternating signal (S1), the threshold signal (S2), and said cyclical signal (S5, S5′), in generating a high speed clock signal (S6), in accumulating the pulses of the clock signal (S6) in the positive direction for the first logic level of the modulated signal (S4), and in a negative direction for the second level of this signal, in sampling the result of this accumulation over at least one period (P) of said alternating signal, and in generating an output signal (6) having a given logical level if the accumulation produces a residual value at the end of the last sampling period.

2. Method according to claim 1, characterized in that said cyclical signal (S5, S5′) is a signal having a triangular form.

3. Method according to claim 2, characterized in that said triangular signal is in step form, the duration of the steps of the signal being determined by the clock signal.

4. Method according to any one of the claims 1 to 3, characterized in that for eliminating the error resulting from the zero offset of said alternating signal and said cyclical signal, there is generated two cyclical signals (S5, S5′) which are synchronous but in phase opposition, and in comparing said alternating signal (S1) and said threshold signal (S2) to these two cyclical signals, for obtaining the said modulated signal.

5. Method according to claim 4, characterized in that the operation of comparison consists, for each period of the alternating signal, in comparing simultaneously said alternating signal and said threshold signal to the two cyclical signals (FIG. 5a).

6. Method according to claim 4, characterized in that the comparison operation includes successively comparing, over two periods of said laternating signal (S1), said alternating signal (S1) and said threshold signal (S2) to a first cyclical signal (S5), and then to a second cyclical signal which is in phase opposition.

7. Method according to claim 6, characterized in that it includes accumulating separately the clock pulses of said high speed clock signal (S6) resulting from the comparison effected with the two cyclical signals (S5, S5′).

8. Method according to claim 7, characterized in that for the separate accumulation of the clock pulses, there is generated two sampling signals (S3′ and S3″) which have the same frequency but which are offset in time one half period, so as to obtain an output signal (6) at a frequency double to that of these sampling signals (S3′ and S3″).

9. Method according to claim 7, characterized in that the frequency of the sampling signal (S3) of said accumulation is derived from the frequency of said cyclical signal (S1).

10. Method according to claim 7, characterized in that there is generated a sampling signal (S3) of the same frequency as said periodic signal for sampling said accumulation.

11. A method according to claim 1, characterized in that said alternating signal is the ring tone signal received from a telephone subscriber line and said direct current component is indicative of whether or not a telephone receiver connected to said subscriber line is lifted.

12. An apparatus for detecting a transition of the direct current component of an alternating signal, characterized in that it includes a binary signal modulator (2) including at least an input terminal (1) for said alternating signal (S1) at least an input terminal for a threshold signal (S2), said modulator including means (13, 14, 14′, 18) for establishing a comparison between said alternating signal (S1), said threshold signal (S2), and a known cyclical signal for modulating said binary signal with the result of the comparison, a high speed clock signal generator and a sampling and up-down counter circuit (5) for respectively measuring, positively and negatively, the durations between the transitions of the modulated binary signal (S4) and for generating an output signal, in the presence of a residual count, representing a transition of said direct current component after the expiration of at least one period of said alternating signal (S1).

13. Apparatus according to claim 12, characterized in that said modulator (2) includes a cyclic signal generator (13), at least a comparison conduit (14, 14′) to which is applied the output of the generator, and said threshold and alternating signals (S1, S2) and which is connected to said sampling and up-down counter circuit (5).

14. Apparatus according to claim 13, characterized in that said generator (13) includes means for generating two cyclic signals (S5, S5′) and in that the outputs of these comparison circuits (14, 14′) are connected to the inputs of a logic combination circuit (15) for controlling the count-up/count-down operation of the sampling and up-down counter circuit (5) as a function of the logical levels of the signals from said comparison circuits (14, 14′).

15. Apparatus according to claim 14, characterized in that said generator (13) is connected to a single comparison circuit (14) by means of a multiplex circuit (18).

16. Apparatus according to claim 15, characterized in that the sampling and up-down counter circuit includes two discrete up-down counters sampled at a frequency which is half of the frequency of the input signal (S1) by two sampling pulses (S3′, S3″) offset in time by one period (P) of said input signal, so as to generate an output signal on output (6) of a frequency equal to the frequency of said input signal.

17. Apparatus according to any one of the claims 12 to 15, characterized in that it is in the form of an integrated circuit with commutated capacitances (CC1, CC2, CI1, CI2, CM).

18. Apparatus according to claim 17, characterized in that the generator (13) of the cyclic signal (S5, S5′) and the comparison and difference means (13, 14, 14′, 18)

are realized in the form of symmetrically geometrical structural elements which operate on the difference of the components of the alternating signal (S1, S1') and the cyclical signal (S5, S5') in actively rejecting the common mode of these components.

19. An apparatus according to claim 12, characterized in that said input terminal is connected to a telephone subscriber line, said alternating signal being a ring tone signal received from said subscriber line and said direct current component being indicative of whether or not a telephone receiver connected to said line is lifted.

* * * * *